Figure 1:
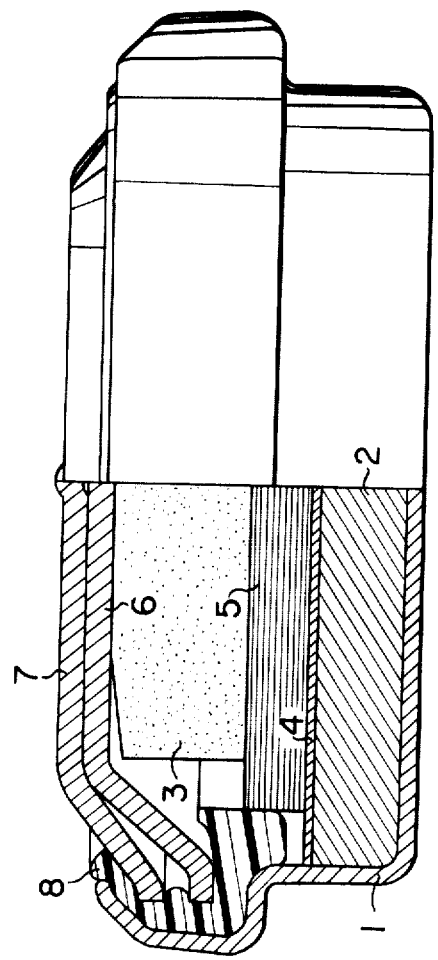

United States Patent [19]
Ieki et al.

[11] 3,892,593
[45] July 1, 1975

[54] ALKALINE CELLS

[75] Inventors: Mitsuru Ieki, Daito; Kenji Inoue, Hirakata; Toshio Shimizu, Daito, all of Japan

[73] Assignee: Matsushita Electric Industrial Co., Ltd., Osaka, Japan

[22] Filed: June 5, 1973

[21] Appl. No.: 367,130

[30] Foreign Application Priority Data
June 20, 1972 Japan.............................. 47-62224

[52] U.S. Cl. ............. 136/133; 260/3.3; 260/85.3 H
[51] Int. Cl. ........................................... H01m 1/02
[58] Field of Search ........ 136/133; 260/3.3, 85.3 H, 260/737

[56] References Cited
UNITED STATES PATENTS

| | | | |
|---|---|---|---|
| 2,072,069 | 2/1937 | Ellis | 260/3.3 X |
| 2,087,337 | 7/1937 | Tomsicek et al. | 260/3.3 X |
| 2,145,412 | 1/1939 | Winklemann | 260/3.3 X |
| 2,287,388 | 6/1942 | McManus et al. | 215/328 |
| 2,290,132 | 7/1942 | Swain et al. | 260/3.3 |
| 2,891,595 | 6/1959 | Kuntz et al. | 260/85.3 X |
| 2,941,975 | 6/1960 | Minckler, Jr. et al. | 260/85.3 X |
| 2,962,480 | 11/1960 | Borunsky | 260/85.3 X |
| 2,965,621 | 12/1960 | Serniuk et al. | 260/85.3 |
| 3,437,611 | 4/1969 | Macklin | 260/3.3 |
| 3,533,970 | 10/1970 | Mihara et al. | 260/3.3 X |
| 3,615,861 | 10/1971 | Braem | 136/133 X |
| 3,661,650 | 5/1972 | Flynn | 136/133 |
| 3,723,184 | 3/1973 | Stark et al. | 136/133 |
| 3,779,979 | 12/1973 | Tsuchiya | 260/85.3 X |

Primary Examiner—Allen B. Curtis
Assistant Examiner—Thomas A. Waltz
Attorney, Agent, or Firm—Stevens, Davis, Miller & Mosher

[57] ABSTRACT

An alkaline cell in which a resin composition comprising a halogenated butyl rubber having styrenic resins and phenolic resins blended therein is used as an insulating gasket interposed between a metal case containing electricity-generating elements therein and a metal sealing plate sealing the open end of said metal case, whereby the leakage of an alkaline electrolyte solution to the outside of the case is effectively prevented.

6 Claims, 3 Drawing Figures

ALKALINE CELLS

This invention relates to alkaline cells such as mercury cells and manganese dioxide-zinc alkaline cells, and provides alkaline cells comprising an improved insulating gasket for sealing the cells, whereby the leakage of electrolyte solution is prevented and the storage characteristic of the cells is improved.

Alkaline cells generally comprise a case containing electrictiy-generating elements therein and serving simultaneously as one electrode terminal, a sealing plate sealing an open end of the cell and serving simultaneously as the other electrode terminal, and an insulating gasket interposed between the open end of the cell and the sealing plate for electrically insulating said case and said sealing plate from each other.

Most of the problems involved in this type of alkaline cell have been electrical shorting, corrosion of external equipments and lowering of the cell capacity which are caused by the outward leakage of the electrolyte solution during use or storage of the cell. The leakage of the electrolyte solution is attributable mainly to the material of the insulating gasket as well as to the sealing method.

For the insulating gaskets of this type of cell, there have been used chloroprene rubber, styrene-butadiene rubber, butyl rubber, isoprene rubber, rubber containing fluorine, polyethylene and polyamides.

Chloroprene rubber is excellent in respect of strength and elasticity, but is poor in sealing property and has the defect that it provides leakage of the electrolyte solution, substantially shortening the storage life of the cell.

Styrene-butadiene rubber is unsatisfactory in respect of resistance to alkali and provides electrical shorting or leakage of the electrolyte solution during use of the cell. Isoprene rubber, because of its high permeability to aqueous vapor, also provides leakage of the electrolyte solution and renders the storage life of the cell remarkably shortened.

Butyl rubber is not adapted for single use because it provides leakage of a large amount of electrolyte solution at the contacting portions of the case and sealing plate due to its large impact resilience and large permanent set factor, although it has a low permeability to aqueous vapor and provides less leakage of electrolyte solution therethrough. Flourine-contained rubber also has a large impact resilience and is unsatisfactory in its bonding property with metals.

Polyamides and polyethylene have high rigidities and no impact resilience, and are extremely poor in bonding property and compatibility with metals.

The present invention contemplates the provision of alkaline cells free of electrolyte solution leakage over an extended period of time and having a long storage life, by improving the conventional insulating gaskets of the materials described above.

By using the insulating gaskets of the invention, an alkaline cell capable of storage for an extended period of time can be obtained, owing to its excellent electrolyte leakage proventing effect.

Figure 2:
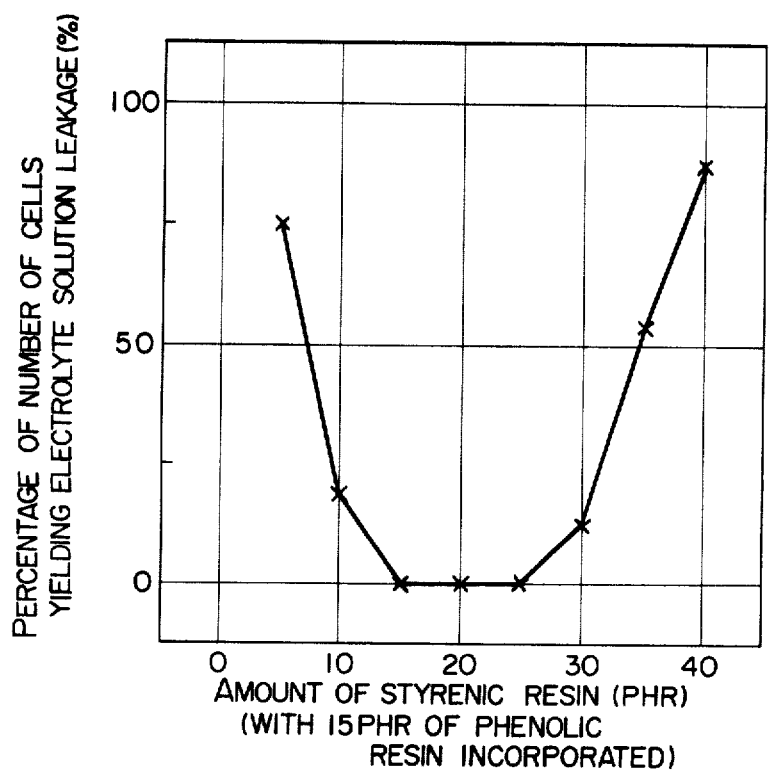
Figure 3:
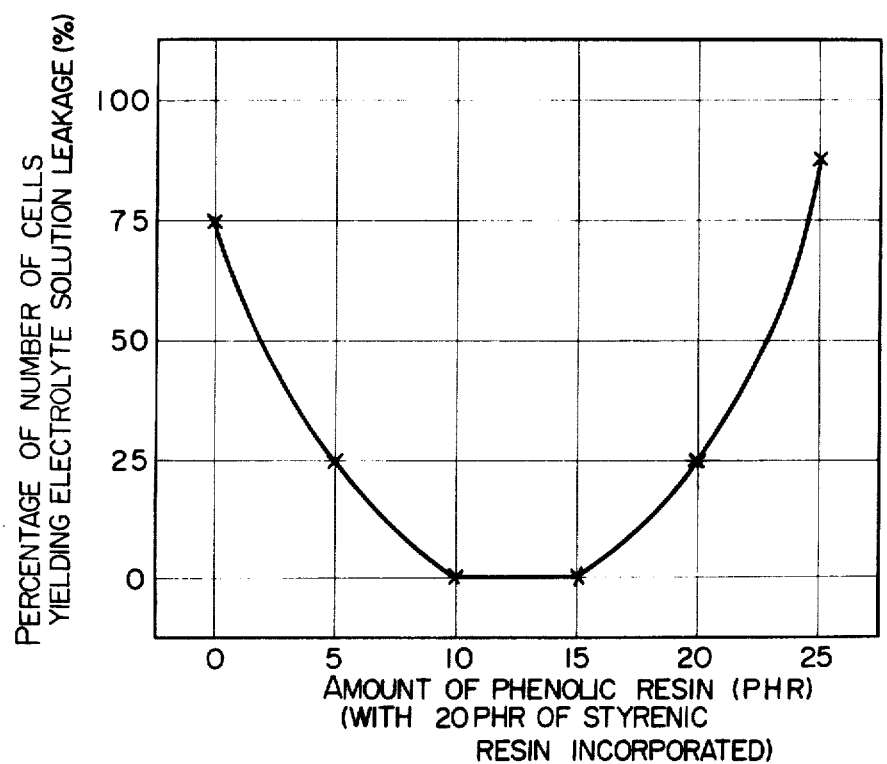

FIG. 1 is a side elevational view of one form of alkaline cell, with the half portion shown in section;

FIG. 2 is a diagram showing the relationship between the amount of styrenic resin in a resin composition constituting an insulating gasket and the percentage of the number of cells yielding electrolyte solution leakage; and FIG. 3 is a diagram similarly showing the relationship between the amount of phenolic resin in the resin composition and the percentage of the number of cells yielding electrolyte solution leakage.

Referring to FIG. 1, there is shown the construction of a typical alkaline cell. Reference numeral 1 designates a case of the cell which is made from a nickel-plated steel sheet and serves simultaneously as a positive electrode terminal. Reference numeral 2 designates a positive electrode mixture compression-molded in the case 1, which, when the cell is a mercury cell, is mercury oxide incorporating about 10 percent by weight of graphite as a conductive material. Reference numeral 3 designates a zinc electrode formed by the compression-molding of a 50–150 mesh zinc powder which is previously amalgamated with about 10 percent by weight of mercury for preventing the corrosion by electrolyte solution. Reference numeral 4 designates an ion-permeable separator which prevents the self-consumption of the fine particles of the positive electrode mixture suspending in the electrolyte solution, by contact with the negative zinc electrode 3. Reference numeral 5 designates an electrolyte solution retainer made of a porous fibrous material for retaining an alkaline electrolyte solution. Reference numeral 6 designates an inner sealing plate and 7 designates an outer sealing plate. These sealing plates are coupled together at the central portions thereof by electric welding. The inner sealing plate 6 is coated with a tin plating to improve the electrical connection with the negative zinc electrode 3, and the outer sealing plate 7 is coated with a nickel plating to prevent the corrosion by external air and serves simultaneously as a negative electrode terminal per se. Reference numeral 8 designates an insulating gasket interposed between the sealing plates 6, 7 and the case 1 to insulate them electrically and also to provide gas-tight sealing therebetween.

For the insulating gasket 8 of the alkaline cell described above, a material is advantageously used which satisfies such conditions that the insulation resistance is high and preferably higher than $10^{12}$ $\Omega$ cm, that the material is highly elastic and has a high recovery and a low permanent set factor, and that the material has a low permeability to aqueous vapor and resistance to alkali.

None of the conventional materials described above have been satisfactory for these conditions. For instance, butyl rubber has excellent electrical and physical properties, and particularly it has a small permeability to aqueous vapor which is highly advantageous in preventing an electrolyte solution from penetrating into a gasket made thereof. However, the alkaline electrolyte solution leaks to the outside of the cell, not only through the gasket but also largely from the joint of the gasket and the cell case or sealing plate. Therefore, the leakage cannot be prevented completely by the gasket made of butyl rubber which has large impact resilience and permanent set factor.

The present invention has been achieved based on the discovery that resin compositions comprising a halogenated butyl rubber as the main constitutent and contaiing styrenic resins and phenolic resins blended therein are highly suitable as materials for insulating gaskets of alkaline cells. By using insulating gaskets made of such compositions, the leakage of an alkaline electrolyte solution due to the creeping phenomenon can be substantially eliminated and alkaline cells can be obtained which will not deteriorate even after storage for an extended period of time in a highly humid condition.

The present invention will be described in further detail below by way of examples. Examples 1 and 2 are prior art gaskets.

EXAMPLE 1

| | |
|---|---|
| Butyl rubber | 100 parts by weight |
| Carbon black | 50 parts by weight |
| Stearic acid | 1 part by weight |
| Zinc oxide | 5 parts by weight |
| Tetramethylthiuram disulfide | 1 part by weight |

An insulating gasket was formed by mixing the materials mentioned above in a Banbury mixer, kneading the mixture on a roll, charging the kneaded mixture in a metal mold and vulcanizing it for 20 minutes at a temperature of 160°C.

EXAMPLE 2

| | |
|---|---|
| Chlorinated butyl rubber | 100 parts by weight |
| Carbon black | 50 parts by weight |
| Stearic acid | 1 part by weight |
| Tetramethylthiuram disulfide | 1 part by weight |
| Zinc oxide | 4 parts by weight |

An insulating gasket was made of the composition described above by the same process as in Example 1.

EXAMPLE 3

Insulating gaskets were made respectively of the compositions shown in Table 1 comprising chlorinated butyl rubber and varying amounts of styrenic resin and phenol formaldehyde resin, by mixing the ingredients of each composition in a Banbury mixer to obtain a homogeneous mixture, kneading the mixture on an open roll, aging the kneaded mixture for about 30 minutes, charging the aged mixture in a metal mold upon cutting it into a predetermined size, heat-treating the charged mixture for 5 minutes at a temperature of 160°C., removing the molded gasket from the metal mold after the metal mold was cooled, and trimming the burre from the gasket.

Using the insulating gaskets of each composition thus made, 100 mercury cells of the construction shown in FIG. 1 and having a diameter of 15.6 mm and a height of 6.0 mm were produced, and the cells were preserved for 70 days in a humid environment of a humidity of 90 % RH or higher, to examine the degree of leakage of alkaline electrolyte solution. The results are shown in FIGS. 2 and 3. FIG. 2 shows the effect of the styrenic resin incorporated in the composition on the electrolyte solution leaking ratio of the cells when the amounts of the chlorinated butyl rubber and phenolic resin are fixed and are respectively 100 parts by weight and 15 parts by weight, and FIG. 3 shows the effect of the phenolic resin incorporated in the composition on the electrolyte solution leaking ratio of the cells when the amounts of the chlorinated butyl rubber and styrenic resin are fixed and are respectively 100 parts by weight and 20 parts by weight. The leakage was determined by the alkali reaction occurring on litmus paper attached to the surface of each cell. The leaking ratio represents the percentage of the number of cells yielding electrolyte solution leakage.

EXAMPLE 4

The same effect can be obtained when brominated butyl rubber is used in lieu of chlorinated butyl rubber. As an example, an insulating gasket was made of the following composition by the same process as in Example 3:

| | |
|---|---|
| Brominated butyl rubber | 100 parts by weight |
| Styrenic resin | 25 parts by weight |
| Phenol formaldehyde resin | 13 parts by weight |
| Carbon black | 30 parts by weight |
| Zinc oxide | 5 parts by weight |
| Tetramethylthiuram disulfide | 1 part by weight |

EXAMPLE 5

The same effect was obtained by using styrenebutadiene copolymers in lieu of the styrenic resin used in Examples 3 and 4. In this case, it is preferable to use copolymers containing more than 80 percent of styrene, because excessively large proportions of butadiene in the composition will have adverse affects on the characteristics of the cell.

A preferred example of the composition comprising styrene-butadiene copolymer is given below:

| | |
|---|---|
| Chlorinated butyl rubber | 100 parts by weight |
| Styrene-butadiene copolymer (90 % by weight of styrene and 10 % by weight of butadiene) | 23 parts by weight |
| Phenol formaldehyde resin | 15 parts by weight |
| Carbon black | 30 parts by weight |
| Stearic acid | 2 parts by weight |
| Zinc oxide | 3 parts by weight |
| Magnesium oxide | 2 parts by weight |

Table 1

| Sample No. | (1) | (2) | (3) | (4) | (5) | (6) | (7) | (8) | (9) | (10) | (11) | (12) | (13) |
|---|---|---|---|---|---|---|---|---|---|---|---|---|---|
| Mixing ratio (part by weight) | | | | | | | | | | | | | |
| Chlorinated butyl rubber | 100 | 100 | 100 | 100 | 100 | 100 | 100 | 100 | 100 | 100 | 100 | 100 | 100 |
| Styrenic resin | 5 | 10 | 15 | 20 | 25 | 30 | 35 | 40 | 20 | 20 | 20 | 20 | 20 |
| Phenol formaldehyde resin | 15 | 15 | 15 | 15 | 15 | 15 | 15 | 15 | 0 | 5 | 10 | 20 | 25 |
| Carbon black | 30 | 30 | 30 | 30 | 30 | 30 | 30 | 30 | 30 | 30 | 30 | 30 | 30 |
| Zinc oxide | 4 | 4 | 4 | 4 | 4 | 4 | 4 | 4 | 4 | 4 | 4 | 4 | 4 |
| Magnesium oxide | 2 | 2 | 2 | 2 | 2 | 2 | 2 | 2 | 2 | 2 | 2 | 2 | 2 |

An insulating gasket was made by processing the above composition in the same manner as in Example 3.

Phenolic resin is effectively used as an additive to the halogenated butyl rubber as stated previously, but it was found that a similar effect can be obtained by using modified phenolic resins. Namely, xylene-modified phenol formaldehyde resin and melamine-modified phenol formaldehyde resin are also effectively used. Examples of the compositions comprising such compounds will be given below:

EXAMPLE 6

| | |
|---|---|
| Chlorinated butyl rubber | 100 parts by weight |
| Styrene-butadiene copolymer (80 % by weight of styrene and 20 % by weight of butadiene) | 23 parts by weight |
| Alkyl phenol resin | 15 parts by weight |
| Carbon black | 30 parts by weight |
| Stearic acid | 2 parts by weight |
| Zinc oxide | 6 parts by weight |
| Magnesium oxide | 1 part by weight |

An insulating gasket was made by processing the above composition in the same manner as in Example 3.

EXAMPLE 7

| | |
|---|---|
| Brominated butyl rubber | 100 parts by weight |
| Styrene-butadiene copolymer (80 % by weight of styrene and 20 % by weight of butadiene) | 23 parts by weight |
| Xylene-modified phenol formaldehyde resin | 15 parts by weight |
| Stearic acid | 2 parts by weight |
| Zinc oxide | 6 parts by weight |
| Magnesium oxide | 1 part by weight |

An insulating gasket was made by processing the above composition in the same manner as in Example 3.

EXAMPLE 8

| | |
|---|---|
| Chlorinated butyl rubber | 100 parts by weight |
| Styrene-butadiene copolymer (80 % by weight of styrene and 20 % by weight of butadiene) | 23 parts by weight |
| Melamine-modified phenol formaldehyde resin | 15 parts by weight |
| Stearic acid | 2 parts by weight |
| Zinc oxide | 6 parts by weight |
| Magnesium oxide | 1 part by weight |

An insulating gasket was made by processing the above composition in the same manner as in Example 3.

The properties of the insulating gasket materials shown in the Examples given above are shown in Table 2.

Table 2

| Example | Intrinsic volume resistivity $\Omega$-cm | Impact resilience factor (%) | Compressive permanent set factor (%) | Aqueous vapor permeability factor × $10^{12}$ gcm/ $cm^3$·sec·cmHg | Weight reduction ratio in alkali (%) | Tensile strength (kg/cm$^2$) | Hardness |
|---|---|---|---|---|---|---|---|
| Measuring method | ASTM D-257 | ASTM D-1054 | ASTM D-412 | ASTM CUP method | | ASTM D-412 | ASTM D-412 |
| 1 | $1.02 \times 10^{17}$ | 63.5 | 13.5 | 14.4 | 0.52 | 85.0 | 95 |
| 2 | $6.80 \times 10^{15}$ | 58.8 | 17.5 | 15.5 | 0.47 | 79.3 | 82 |
| 3 | $7.95 \times 10^{16}$ | 76.6 | 7.3 | 12.3 | 0.40 | 180.5 | 73 |
| 4 | $8.75 \times 10^{16}$ | 75.8 | 6.5 | 11.6 | 0.37 | 195.0 | 71 |
| 5 | $7.50 \times 10^{16}$ | 81.2 | 4.9 | 12.0 | 0.35 | 205.5 | 70 |
| 6 | $8.86 \times 10^{16}$ | 85.5 | 3.8 | 10.5 | 0.41 | 220.5 | 71 |
| 7 | $9.05 \times 10^{13}$ | 79.8 | 4.6 | 9.8 | 0.30 | 205.0 | 68 |
| 8 | $9.02 \times 10^{15}$ | 76.5 | 5.5 | 7.6 | 0.31 | 203.0 | 65 |

The test samples used for measuring these properties were respectively made of the compositions shown in the Examples given above by the methods specified in ASTM, and the measurements were taken according to the methods also specified in ASTM. The weight reduction ratios of alkali were determined by immersing each sample of a size of 5 × 5 × 0.1 cm$^3$ in a 20 percent by weight potassium hydroxide aqueous solution for 24 hours and thereafter measuring the weight reduction.

The gasket materials of the invention shown in Examples 3–8, as compared with the conventional gaskets shown in Examples 1 and 2, have large impact resilience factors and small compressive permanent set factors, and hence, have excellent packing characteristics, and further, they have small aqueous vapor permeability factors. Therefore, the gasket materials of the invention are effective for the prevention of electrolyte solution leakage due to the creeping phenomenon.

In order to make more explicit the effect of the present invention, a leakage acceleration test was conducted on each gasket. In the testing, the mercury cells of the construction shown in FIG. 1, each having a diameter of 15.6 mm and a height of 6.0 mm and comprising each of the insulating gaskets made in the Examples given above, were stored in an environment of a humidity of 90 percent RH or higher, and the external leakage of the electrolyte solution and the capacity of each cell were checked from time to time at a predetermined interval. The leakage was determined by the alkali reaction occurring on litmus paper in contact with the outer surface of the cell. For each gasket, 100 sample cells were submitted for the testing. The results of the testing are shown in Table 3.

Table 3

| Example | \multicolumn{12}{c}{Percentage of cells yielding electrolyte solution leakage (%)} |
| --- | --- | --- | --- | --- | --- | --- | --- | --- | --- | --- | --- | --- |
| | 2 | 4 | 6 | 8 | 10 | 12 | 14 | 16 | 18 | 20 | 22 | 24 |
| 1 | 0 | 11 | 28 | 53 | 98 | 100 | | | | | | |
| 2 | 0 | 5 | 21 | 39 | 70 | 95 | 100 | | | | | |
| 3 | 0 | 0 | 0 | 0 | 0 | 2 | 3 | 10 | 31 | 68 | 82 | 97 |
| 4 | 0 | 0 | 0 | 0 | 0 | 3 | 5 | 18 | 41 | 74 | 88 | 100 |
| 5 | 0 | 0 | 0 | 0 | 0 | 0 | 3 | 5 | 27 | 51 | 71 | 85 |
| 6 | 0 | 0 | 0 | 0 | 0 | 1 | 2 | 4 | 31 | 52 | 87 | 100 |
| 7 | 0 | 0 | 0 | 0 | 1 | 2 | 4 | 7 | 41 | 73 | 91 | 100 |
| 8 | 0 | 0 | 0 | 0 | 3 | 5 | 12 | 23 | 56 | 88 | 100 | |

As shown, the cells comprising the insulating gaskets of Examples 1 and 2 showed leaking electrolyte solution already after storage for 4 weeks, and 100 percent of them showed leaking electrolyte solution after the lapse of 12–14 weeks. As contrasted, the cells comprising the gaskets of this invention showed leaking electrolyte solution only after the lapse of 8–12 weeks. This means that the cells comprising the gaskets of this invention have a preservable life 2 to 3 times longer than that of the conventional cells. An increasing amount of the electrolyte solution leaking from the cell causes electrical shorting of the cell or a capacity lowering of the cell due to a shortage of the electrolyte solution, and also causes corrosion of an equipment in which the cell is used. Therefore, the prevention of the electrolyte solution leakage is the most important problem for the alkaline cells. According to the present invention, alkaline cells having long preservable lives can be obtained as illustrated in the Examples given above.

The insulating gaskets of the invention are made of resin compositions comprising a halogenated butyl rubber, such as chlorinated butyl rubber or brominated butyl rubber as the main constituent, and suitable amounts of styrenic resin and phenolic resin incorporated in the halogenated butyl rubber have the effects of imparting the optimum impact resilience and hardness to the gaskets made of the composition, lowering the compressive permanent set factor of the gasket and producing a good bond between the packing and the metal of which the cell case or sealing plate is made. The gaskets of the invention are capable of preventing the leakage of electrolyte solution, presumably because the styrenic resin provides a barrier highly effective against the creeping phenomenon of the electrolyte solution and concurrently the phenolic resin provides sealing of the small gap by being swollen suitably by the alkaline electrolyte solution. Therefore, the leakage preventing effect of the gaskets of the invention is diminished in the absence of either one of the phenolic and styrenic resins, and it becomes essential to maintain the proportions of the constituents of the resin composition. FIGS. 2 and 3 show the effects of the styrenic and phenolic resins incorporated in the resin composition in varying amounts, as described in Example 3. It will be understood from the diagrams of FIGS. 2 and 3 that a good result can be obtained when the styrenic resin is incorporated in an amount of 10–30 parts by weight and the phenolic resin in an amount of 5–20 parts by weight, per 100 parts of the halogenated butyl rubber.

As described in Examples 5–8, the styrenic resin is not necessarily simple styrene but may be styrenic resins containing a large proportion of styrene, e.g. styrene-butadiene copolymer resins, which facilitate the moldability of the gaskets.

Other additives include, besides the carbon black mentioned in the Examples, silica and clay which can be used as reinforcing agents. These additives are used in the range of 20–50 parts by weight per 100 parts of the halogenated butyl rubber. Vulcanizers, such as tetramethylthiuram disulfide, zinc oxide and magnesium oxide, are used in the range not larger than 10 parts by weight, and lubricants, such as stearic acid, in the range not larger than 5 parts by weight.

Although the present invention has been described and illustrated herein as applied to mercury cells, it should be understood that the invention is similarly applicable to other batteries comprising alkaline electrolyte solutions, such as manganese dioxide-zinc alkaline cells and closed nickel-cadmium alkaline storage batteries. It should also be understood that the construction of the cell to which the present invention is applicable is not limited to that shown in the drawing, but many modifications are possible, for example, by making the cell case in a double-wall structure or using a single sealing plate.

What is claimed is:

1. An alkaline cell comprising a metal case containing electricity-generating elements therein, a metal sealing plate sealing the open end of said case, and an insulating gasket interposed between the open end of said case and said sealing plate, said gasket being made of a resin composition comprising a halogenated butyl rubber as the main constituent and a styrenic resin and a phenolic resin incorporated therein.

2. An alkaline cell according to claim 1, in which said gasket is made of a resin composition comprising a halogenated butyl rubber, and a styrenic resin and a phenolic resin incorporated therein respectively in an amount of 10–30 parts by weight and an amount of 5–20 parts by weight per 100 parts of said halogenated butyl rubber.

3. An alkaline cell according to claim 2, in which said halogenated butyl rubber is chlorinated butyl rubber or brominated butyl rubber.

4. An alkaline cell according to claim 2, in which said phenolic resin is selected from the group consisting of alkyl phenol aldehyde resin, melamine-modified phenol aldehyde resin and xylene-modified phenol aldehyde resin.

5. An alkaline cell according to claim 2, in which said styrenic resin is styrene resin or a styrene butadiene copolymer resin containing a predominant proportion of styrene.

6. An alkaline cell according to claim 2, in which said resin composition further comprises 20–50 parts by weight of a reinforcing agent, not more than 10 parts by weight of a vulcanizer and not more than 5 parts by weight of a lubricant.

* * * * *